United States Patent [19]
Keller et al.

[11] Patent Number: 5,467,695
[45] Date of Patent: Nov. 21, 1995

[54] DEVICE FOR PREPARING FOODS

[75] Inventors: Dieter Keller, Oberderdingen; Manfred Mück, Kürnbach, both of Germany

[73] Assignee: Blanco GmbH & Co. KG, Oberderdingen, Germany

[21] Appl. No.: 255,675

[22] Filed: Jun. 8, 1994

[30]     Foreign Application Priority Data

Sep. 29, 1993 [DE] Germany .......................... 43 33 158.0

[51] Int. Cl.⁶ ..................................................... A47J 37/10
[52] U.S. Cl. ................... 99/422; 99/447; 99/449; 126/39 H; 126/39 J; 219/462; 219/463; 219/464
[58] Field of Search ............................ 99/422, 447, 449, 99/450, 385, 401; 126/41 R, 39 H, 39 J, 9 R; 219/443, 457, 458, 459, 461, 462, 463, 464

[56]             References Cited

U.S. PATENT DOCUMENTS

| 3,552,302 | 1/1971 | Gilberg ............................ 99/450 |
| 3,826,898 | 7/1974 | Hurko et al. ..................... 219/459 |
| 3,885,128 | 5/1975 | Dills ................................. 219/457 |
| 4,342,259 | 8/1982 | Lee .................................. 99/447 |
| 4,353,347 | 10/1982 | Seed ................................ 99/450 |
| 4,843,218 | 6/1989 | Husslein et al. ................ 219/461 |
| 5,221,829 | 6/1993 | Yahav et al. .................... 219/457 |

FOREIGN PATENT DOCUMENTS 84 28 453.6  3/1985  Germany .
92 15 234.1  4/1993  Germany .

OTHER PUBLICATIONS

Brochure and user manual for the "Gourmet" table of the German company deci kochdesign.

*Primary Examiner*—David Scherbel
*Assistant Examiner*—Reginald L. Alexander
*Attorney, Agent, or Firm*—Barry R. Lipsitz

[57]             ABSTRACT

A table-like device is provided for preparing foods. A one-piece tabletop is made of stainless steel sheet metal. The tabletop has a central downward curvature. A heating device is arranged beneath the tabletop for heating the central region thereof. A plate-like heat transfer element, an electric heating element and a plate-like reflector are arranged, one below the other, under the central region of the tabletop for efficiently and uniformly heating the central region.

35 Claims, 10 Drawing Sheets

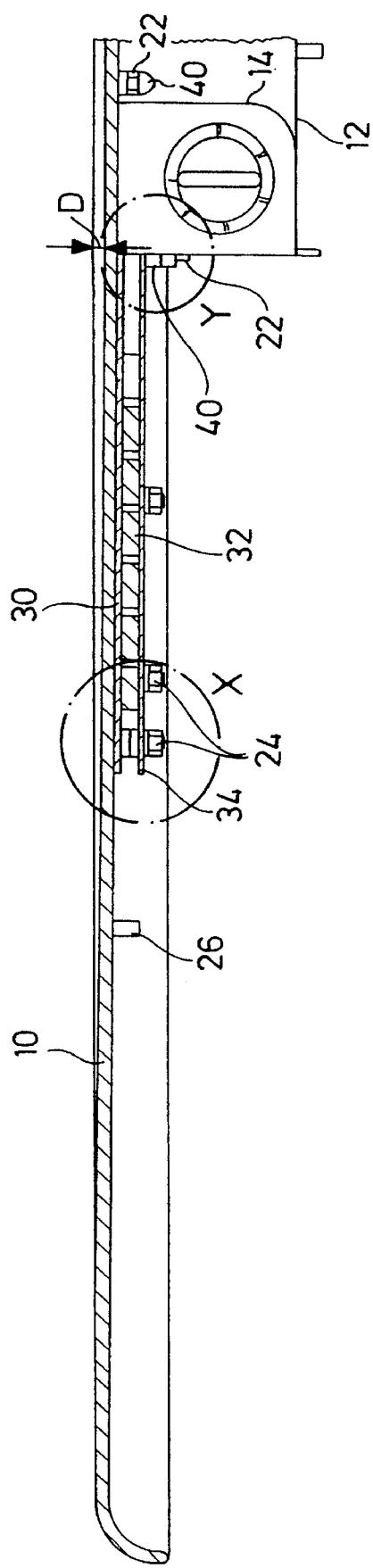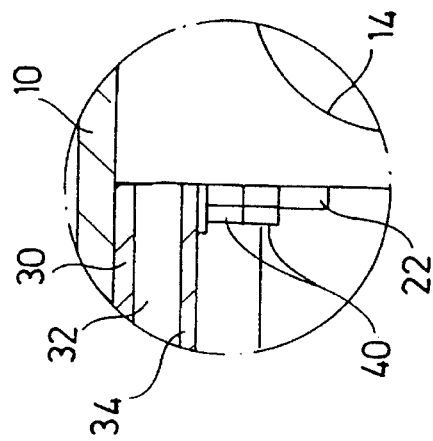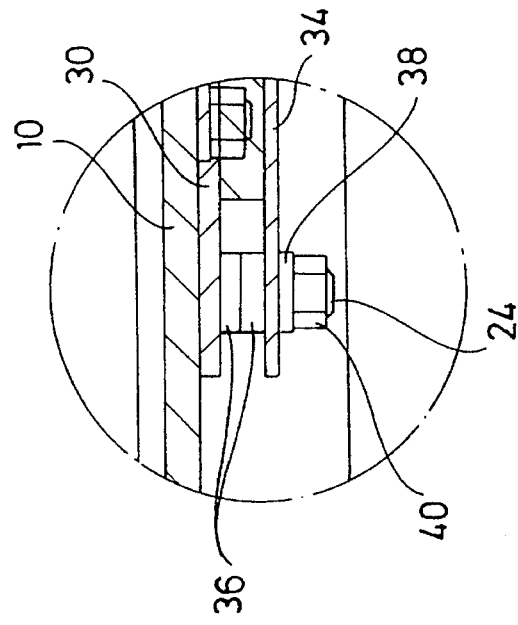

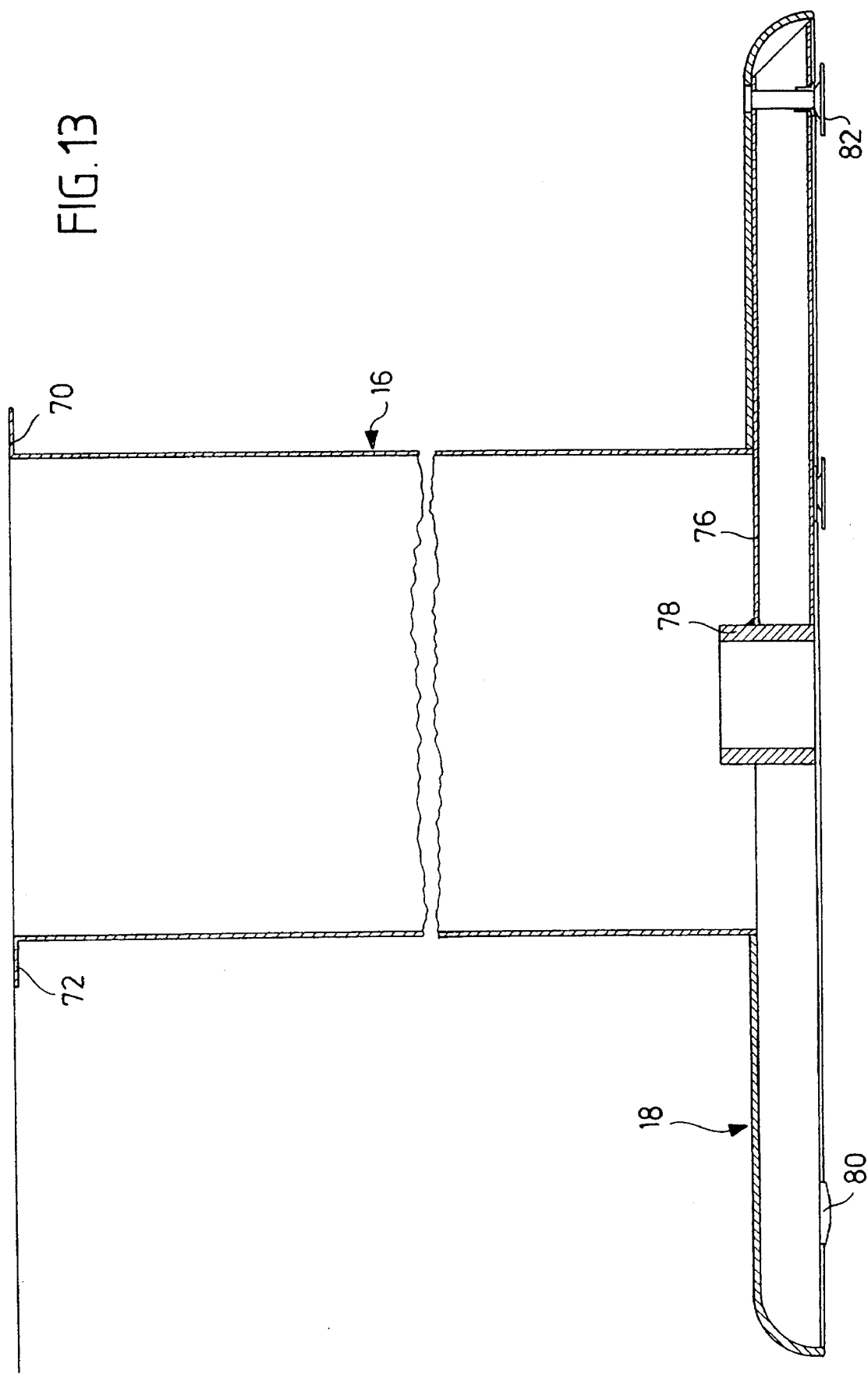

DEVICE FOR PREPARING FOODS

The invention relates to a device for preparing foods, whereby the preparation of foods is to be understood not only as the roasting, grilling, frying and cooking of food in any other way but also, for example, the heating of meals or foods which are already cooked.

Devices of this type normally have the form of a hot plate, an oven or a microwave.

The present invention now relates to such a device for preparing foods which has the shape of a table with the following features:

(a) a one-piece tabletop made of stainless steel sheet metal, which has a downward curvature at least in a central region and thus forms a trough;

(b) a heating device for heating the central region of the tabletop is arranged beneath the tabletop, and (c) the tabletop together with the heating device is supported by at least one column-like support with a foot attached to its lower end.

With such a device it is possible not only to prepare foods but also to eat the prepared foods at the table-like device.

Since stainless steel sheet metal is known to be a relatively poor heat conductor and only the central region of the tabletop is heated with the heating device, a relatively broad peripheral region of the tabletop remains cool to cold so that the prepared foods can be eaten in this region, and foods can be kept warm on a transitional region between this cold or cool peripheral region and the heated central region of the tabletop.

The stainless steel sheet metal, from which the tabletop is formed, preferably has a thickness of approximately 5 mm, and the edge of the tabletop has a profile increasing the torsion resistance of the tabletop, either in the shape of a downwardly bent edge region of the stainless steel sheet metal forming the tabletop or in the form of a reinforcement profile secured to the edge of the tabletop.

The column-like support for the device will generally be a support attached beneath the center of the tabletop so that the table has a single central foot. In principle, it is, however, also conceivable to provide the table with, for example, three or four table legs.

If the central region of the tabletop made of stainless steel sheet metal were to be directly heated from below, for example with a gas burner, the central region of the tabletop would not only have an uneven temperature profile but would also tend to form tempering colors on its upper side. It would be even more problematic to attain an even temperature profile over the central region of the tabletop of stainless steel sheet metal if this were to be heated directly from below with an electric heating element. To eliminate these problems, a table-like device of this type is designed in accordance with the invention such that a single, one-piece heat transfer element in the form of a metal plate made of a metal is arranged in the central region of the tabletop on its underside between this and the heating device, the heat conductivity of this metal being greater than that of stainless steel, and that the plate-like heat transfer element is mechanically connected to the tabletop in such a manner that it, on the one hand, always abuts against the underside of the tabletop at least almost over its entire surface—even when the tabletop is heated—and, on the other hand, can carry out a movement relative to the tabletop in the contact surface of tabletop and heat transfer element to compensate for different heat expansions of tabletop and heat transfer element. Such a one-piece heat transfer element is not only more simple and less expensive to produce and mount than an array of heat transfer segments but it also leads to a more uniform temperature profile in the central region of the tabletop. The inventive solution also takes into consideration the circumstance that the plate-like heat transfer element and the tabletop expand and contract to different degrees during heating and cooling—the different coefficients of temperature expansion would otherwise cause the tabletop and/or the plate-like heat transfer element to warp and the connection between tabletop and heat transfer element to be ruined, e.g. if the heat transfer element were to be soldered to the underside of the tabletop over its entire surface.

Embodiments are particularly favorable, in which the heat transfer element is a copper plate, since copper is an extremely good heat conductor. This means that not only will the heat be transferred rapidly from the heating device to the tabletop but also the tabletop will remain at the same heat all over its central region when food to be cooked is placed on the central region of the tabletop.

Since the downward curvature of the tabletop will be increased during the course of heating and the plate-like heat transfer element should be able to adapt to the change in shape of the tabletop, it is recommended that a thickness of a maximum of approximately 3 mm, preferably of a maximum of approximately 2 mm and, in particular, of approximately 1.5 mm be selected for the plate-like heat transfer element. This has shown that the desired adaptation of the heat transfer element to the tabletop is then ensured, just the same as a uniform temperature profile on the upper side of the central region of the tabletop.

For the connection between the plate-like heat transfer element and the tabletop it is recommended that the heat transfer element be pressed against the underside of the tabletop by means of threaded bolts fixed to the underside of the tabletop and nuts. The threaded bolts can pass through holes in the plate-like heat transfer element, the nuts can be tightened directly against the underside of the plate-like heat transfer element. It would, however, also be conceivable to provide the threaded bolts next to the edge of the heat transfer element, to push onto the threaded bolts clamping brackets or the like which engage the underside of the heat transfer element and press these with the nuts against the heat transfer element. In any case it is ensured that the plate-like heat transfer element can carry out the required relative movement in relation to the tabletop in the contact surface when, in the event that the threaded bolts pass through holes in the heat transfer element, these holes are larger than the diameter of the threaded bolts at least in radial direction.

In a particularly advantageous embodiment of the inventive device, a first threaded bolt attached in the center of the tabletop passes through the center of the plate-like heat transfer element and, in addition, a circle of second threaded bolts surrounding this center is provided, these threaded bolts reaching through holes in the heat transfer element which are larger than the diameter of the second threaded bolts at least in radial direction. This type of attachment ensures a particularly good adaptation of the plate-like heat transfer element to the changes in shape occurring in the tabletop.

In order to prevent corrosion and enable the threaded bolts to be fixed to the tabletop made of stainless steel sheet metal without problem, it is recommended that stainless steel likewise be chosen as material for the threaded bolts. If the nuts were also produced from stainless steel there would be the risk that these could no longer be loosened at a later date once the inventive device has been in use for some time. For this reason, it is suggested that the nuts be constructed such that their threaded region has at least one layer made from a metal which is softer in comparison to stainless steel. In the case of the nuts, these are preferably copper nuts but it is, for example, also possible to use nuts made from stainless steel, the threaded region of which is coated with a layer of a "lubricating" metal, such as, for example, copper, or a copper paste has been applied thereto.

In particularly advantageous embodiments of the inventive device, the heating device is an electric heating element which is clamped between the plate-like heat transfer element and a plate-like reflector arranged beneath the heating element. In this way, it is not only ensured that the abutment of the heating element against the plate-like heat transfer element is as good as possible but an unnecessary and, in certain circumstances, even detrimental loss of energy downwards is also avoided. In this respect, a reflector is recommended in the form of a metal plate made of a metal having a lower heat conductivity than that of the metal of the plate-like heat transfer element, and not only because relatively less heat is then radiated downwards but also because the plate-like reflector is then subjected to smaller changes in dimension during heating and cooling than the plate-like heat transfer element which is a good heat conductor. For the specified reasons, a plate made of stainless steel is particularly advantageous as reflector.

In preferred embodiments of the inventive device, the metallic, plate-like reflector has a thickness of approximately 2 mm which, in certain circumstances, can also be reduced to approximately 1.5 mm. Such a reflector not only fulfills its function of preventing too great a loss of energy downwards to a satisfactory degree but it is also sufficiently rigid to aid in pressing the electric heating element against the plate-like heat transfer element.

A particularly simple attachment of the reflector is again made possible by threaded bolts fixed to the underside of the tabletop and nuts screwed onto them. In this respect, it is recommended that the same threaded bolts and nuts, with which the plate-like heat transfer element is held in position, also be used to secure the reflector in place.

For reasons of energy and for mechanical reasons, the plate-like heat transfer element and the plate-like reflector of a particularly advantageous embodiment of the inventive device are—when viewed vertically to the tabletop—at least approximately of the same size and at least of the same size as the heating element.

The electric heating element is advantageously constructed as a tubular heating element which has a meander-shaped or spirally shaped design and the tube of which has a flattened, non-circular cross section and abuts against the heat transfer element and the reflector with its flat sides. In any case, i.e. even with a plate-like heating element, it is recommended that the construction be designed such that the first threaded bolt passes through an opening in the heating element, that the heating element is located within the circle formed by the second threaded bolts, that the threaded bolts pass through holes in the reflector and that the nuts are located on the underside of the reflector.

In order to avoid unnecessary deformations of the reflector, it is recommended that spacer elements be arranged on the second threaded bolts between heat transfer element and reflector, the thickness of these spacer elements corresponding to that of the heating element. Cup springs or the like penetrated by the second threaded bolts could also be provided to ensure that the plate-like heat transfer element is always pressed firmly enough against the underside of the tabletop.

Particularly when using an electric heating element, the inventive device is advantageously provided with a covering hood attached to the underside of the tabletop, this covering hood covering the heat transfer element and the heating device and the inside thereof being coated with heat-insulating material. In this way, not only can unnecessary energy losses downwards be avoided but the risk of an accident is also ruled out. In the case of the covering hood, this is expediently a part made from stainless steel sheet metal and shaped by deep drawing. Threaded bolts fixed to the underside of the tabletop and nuts screwed onto these bolts are again recommended for the attachment of the covering hood; these threaded bolts could, in principle, be the second threaded bolts. However, embodiments are preferred which have a circle of third threaded bolts surrounding the circle formed by the second threaded bolts, these third threaded bolts holding the covering hood.

To avoid having to arrange control and regulating means for the heating device in a region, in which relatively high temperatures prevail during use of the inventive device, which electronic components, above all, are often not capable of withstanding, particularly advantageous embodiments of the inventive device are constructed such that lines leading away from the heating device (whether these be energy supply lines or lines serving control and regulating purposes) are guided through an opening in the covering hood outwards to an electric switching device which is secured to the underside of the tabletop. It is especially recommended for such embodiments that a cable conduit housing accommodating the electric lines be secured to the underside of the tabletop outside the covering hood in order to cover and shield the lines outside the covering hood. In such an embodiment, it is additionally recommended that the cable conduit housing be provided with the switching device. The cable conduit housing can consist of temperature-resistant plastics or the like but cable conduit housings designed as sheet metal housings are preferred. Threaded bolts fixed to the underside of the tabletop and nuts screwed onto these bolts are again recommended for attaching the cable conduit housing to the underside of the tabletop.

If the inventive device, as is preferred, has the shape of a table with a single central foot, it is recommended that this column-like support be releasably secured to the covering hood, in particular by means of, for example, threaded bolts secured to the covering hood and nuts screwed onto these bolts, the threaded bolts penetrating an attachment flange of the support. In such a construction, the central foot can be detached from the tabletop in a simple manner without exposing parts of the heating device and its control or regulation means, a circumstance which is of advantage, above all, during transport of the inventive device.

The inventive, table-like device will need to satisfy relatively high requirements with respect to the rigidity and undesired inclinations and tilting movements of the tabletop. For this reason, particularly advantageous embodiments provide for the foot to have at least three supporting elements on its underside. The device rests on the ground with these elements, two of which are rigidly connected to the foot and at least one of which is height-adjustable. Even more advantageous are embodiments, in which the foot is provided with five supporting elements forming a circle surrounding the longitudinal axis of the column-like support and three of these elements which follow one another in circumferential direction of this circle are height-adjustable. Such a design of the foot leads to considerable advantages: If the inventive device is, for example, set up on a terrace which normally has a slight inclination to allow water to flow off, the device is levelled first of all by adjusting the middle of the three height-adjustable supporting elements such that the upper side of the tabletop extends horizontally, whereupon the other two supporting elements are adjusted so that they also rest on the ground. A device of this type is, in theory, statically over-determined because it does not have a three-point contact on the ground; in practice, this is not, however, a disadvantage but an advantage because the inventive device is generally set up in areas where the ground is not, in any case, absolutely level.

As already mentioned, the inventive device will generally have to meet relatively high requirements concerning its stability and rigidity. These also presuppose a rigid foot which is, however, intended to have a good appearance at the same time. For this reason, it is suggested for preferred embodiments that the foot have a downwardly open, dish-shaped covering hood with profiled arms arranged therein which are connected with one another and extend in a star configuration in relation to the longitudinal axis of the column-like support. Each of these profiled arms is provided with a supporting element. In order to make some of these arms height-adjustable and still not have to dispense with the covering hood which is advantageous due to its appearance, it is suggested that a vertically oriented nut thread be secured to each of the profiled arms provided with a height-adjustable supporting element and a threaded pin be screwed into the nut thread, the supporting element be located at the lower end of the threaded pin, the upper end of which is provided with screw-tool attachment surfaces, and the covering hood of the foot have an opening above the pin for insertion of a screw tool. In such a device, the height-adjustable supporting element or elements can be adjusted from the upper side of the covering hood. Finally, closure caps or plugs which close the covering hood openings but are removable can be provided and these are customarily rubber or plastic parts.

Additional features, details and advantages of the invention result from the following description as well as the attached drawings of a particularly advantageous embodiment of the inventive device; in the drawings:

FIG. 5 shows part of FIG. 3 but on a larger scale;

FIG. 6 shows the detail marked "X" in FIG. 5 on an even larger scale;

FIG. 7 shows the detail marked "Y" in FIG. 5 on an even larger scale;

FIG. 13 is an axial section through the central foot, i.e. the column-like support and the foot secured thereto;

Figure 1:
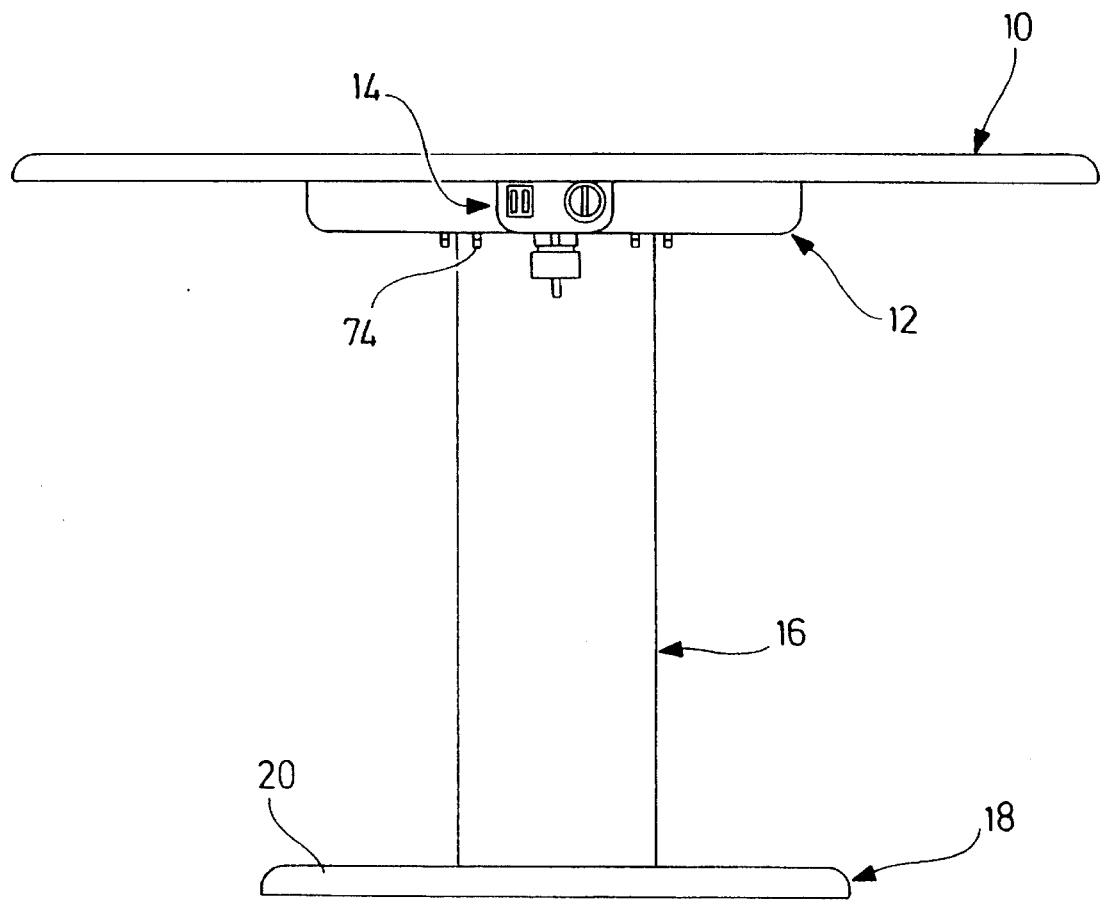
FIG. 1 is a side view of the inventive, table-like device.
Figure 2:
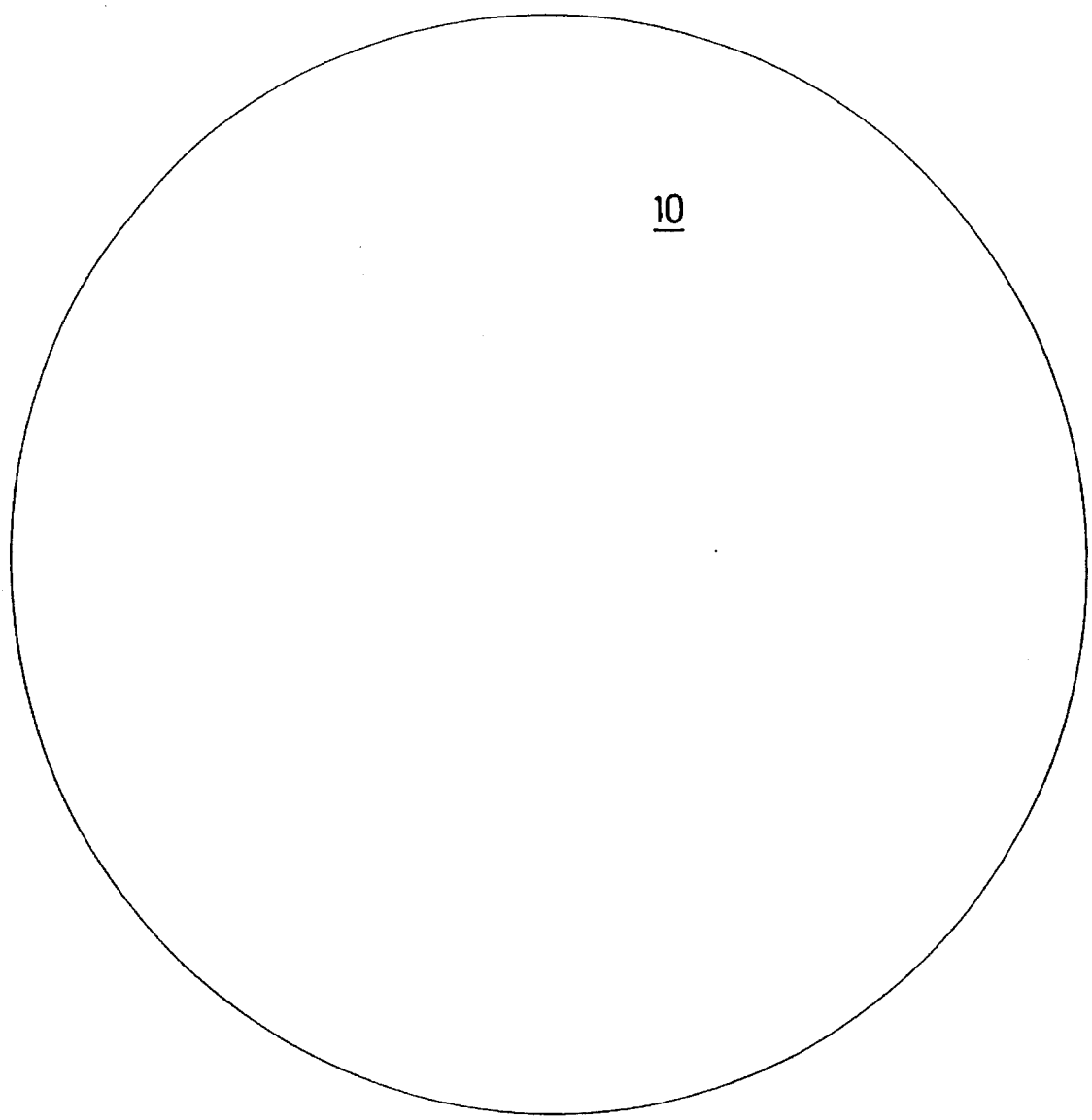
FIG. 2 is a plan view onto the tabletop of this device.

The inventive, table-like device illustrated as a whole in FIGS. 1 and 2 has a tabletop 10 produced from stainless steel sheet metal. A covering hood 12 likewise produced from stainless steel sheet metal and a cable conduit housing 14 are secured to the underside of this tabletop; this housing has likewise been produced from stainless steel sheet metal.

A column-like support 16 likewise produced from stainless steel sheet metal is screwed to the underside of the covering hood 12 and has a foot designated as a whole as 18 secured to its lower end; this foot has a covering hood 20 deep-drawn from stainless steel sheet metal which has been welded to the support 16.

What FIGS. 1 and 2 do not show is the fact that the upper side of the tabletop 10 is not absolutely flat but forms at least in its central region an extremely shallow trough (downward curvature), the greatest depth of which is located in the center of the tabletop 10 and in the cold state of the tabletop is preferably approximately 5 mm (measured in relation to a horizontal plane which is tangent to the upper outer edge of the tabletop).

Figure 4:
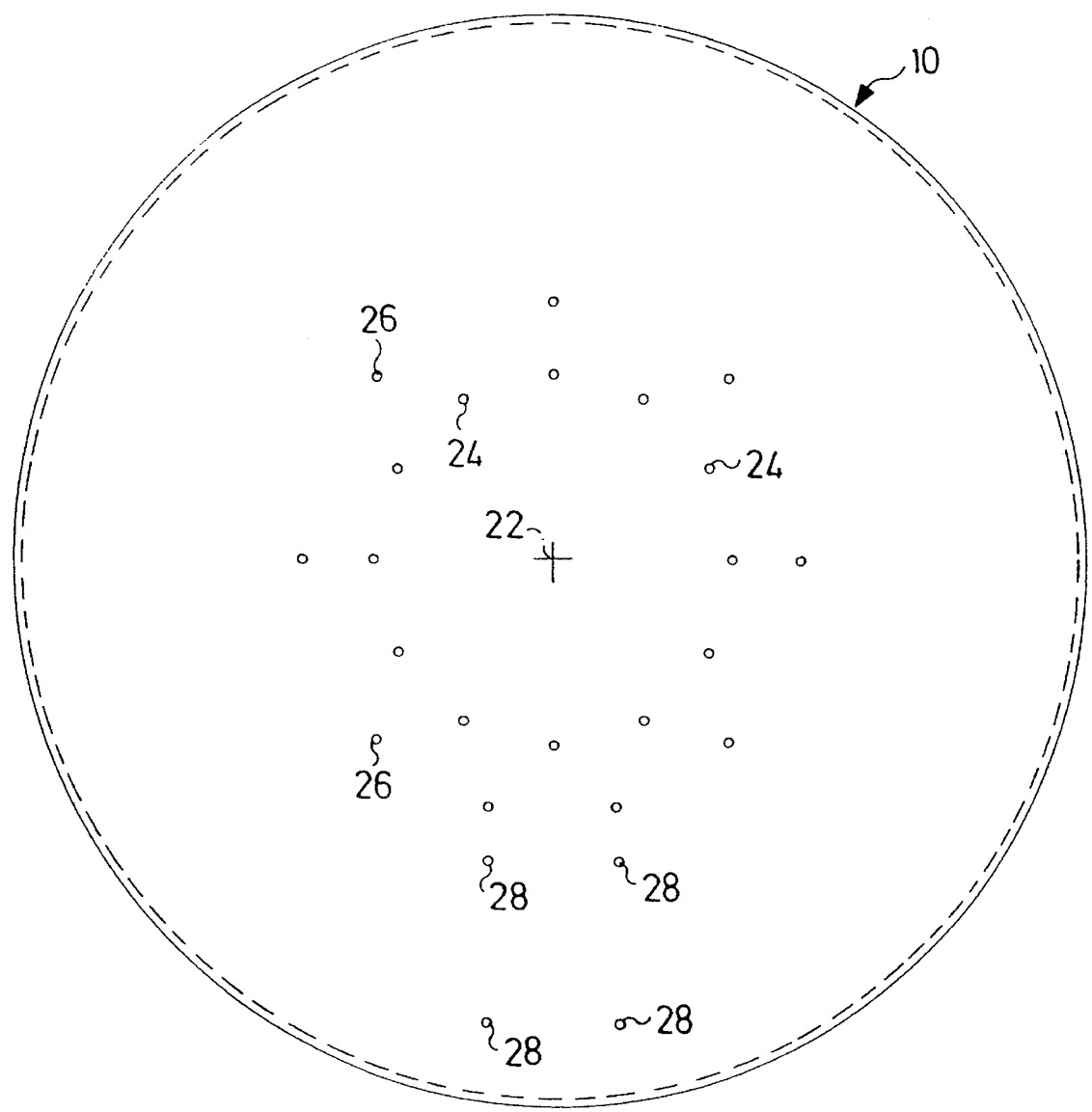
FIG. 4 is a view of the tabletop from below showing the arrangement of the various threaded bolts.

A plurality of threaded bolts made of stainless steel are butt-welded to the underside of the tabletop 10 so that they are oriented at right angles to the tabletop. FIG. 4 shows the positions of these threaded bolts. In this respect, a central first threaded bolt 22 is surrounded by a first circle of second threaded bolts 24, and this circle is, for its part, surrounded by an additional circle of third threaded bolts 26. Furthermore, four threaded bolts 28 are provided which serve to attach the cable conduit housing 14.

Figure 3:
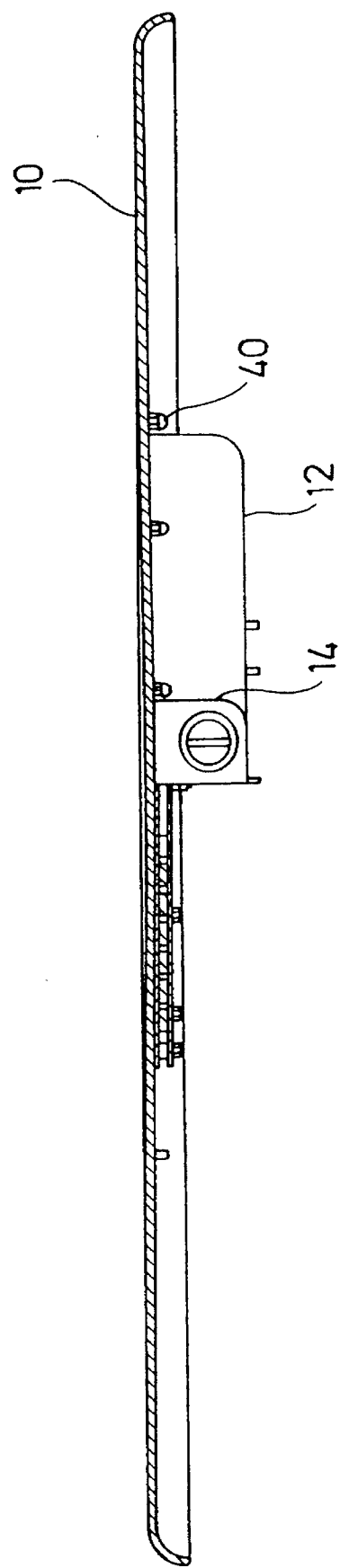
FIG. 3 shows a section along a vertical plane through the tabletop of the device and the components secured to its underside, the right half of FIG. 3, however, illustrating the covering hood and the cable conduit housing in a front view.

FIGS. 3 and 5 show the downward curvature of the tabletop 10 the greatest depth of the trough has been designated as "D" in FIG. 5.

On the basis of FIGS. 3 and 5 to 7, the means used to heat the central region of the tabletop 10 will first of all be explained and how these means are constructed and mounted.

A circular copper plate 30 abuts against the underside of the tabletop 10 over its entire surface. It has a central hole which is not illustrated and which is penetrated fittingly by the threaded bolt 22 as well as longitudinal holes which are likewise not illustrated, are oriented in a radial direction and penetrated by the threaded bolts 24. An electric heating element 32 rests against the underside of the copper plate 30 which forms a heat transfer element. The heating element is a known flat-pipe heating element which has the shape of a spiral and is penetrated by the central threaded bolt 22. A reflector 34 rests against the underside of the heating element 32. This reflector has the form of a circular plate made from stainless steel sheet metal and, like the copper plate 30, is provided with correspondingly designed holes, which are not illustrated, for the passage of the threaded bolts 22 and 24. Annular spacer elements 36 which are pushed onto the threaded bolts 24 are located between the copper plate 30 and the reflector 34. The overall thickness of these spacer elements corresponds to the thickness of the heating element 32 or is, rather, somewhat smaller than this. Tooth lock washers 38 which are pushed onto the threaded bolts 22 and 24 are located on the underside of the reflector 34 and, finally, copper nuts 40 are screwed onto the threaded bolts 22 and 24 and with their aid the copper plate 30, the heating element 32 and the reflector 34 can be secured in place against one another and against the underside of the tabletop 10.

Figure 8:
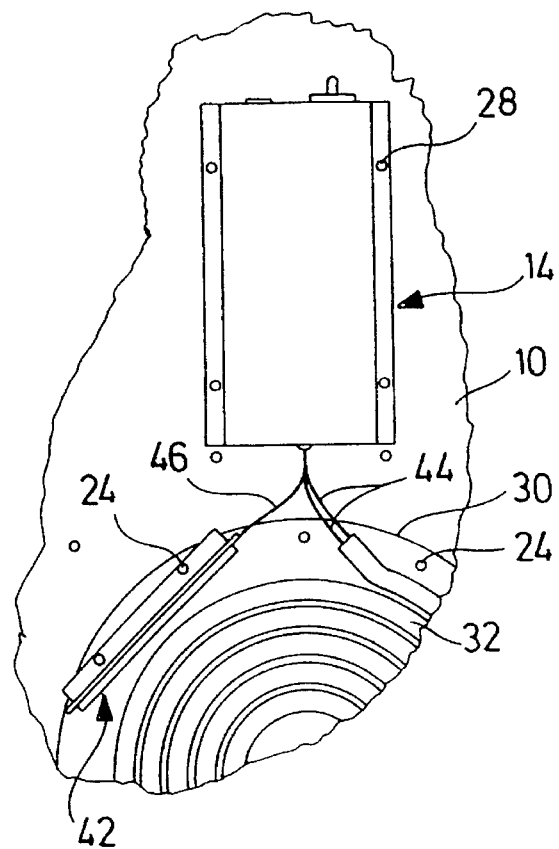
FIG. 8 shows the cable conduit housing secured to the underside of the tabletop and parts of the heating device, viewed from below at right angles to the tabletop.

FIG. 8 shows a view from below of the cable conduit housing 14 as well as the threaded bolts 28 provided with nuts 40; with the aid of these bolts the cable conduit housing is secured to the underside of the tabletop 10. Moreover, FIG. 8 shows the heating element 32, the copper plate 30 and the threaded bolts 24 serving to secure them. A temperature sensor 42 attached to the underside of the copper plate 30 in the immediate vicinity of the heating element 32 is also held in position with the aid of these bolts. Electric connection lines 44 of the heating element 32 and a capillary line 46 of the temperature sensor 42 are, as shown in FIG. 8, introduced into the cable conduit housing 14.

Figure 9:
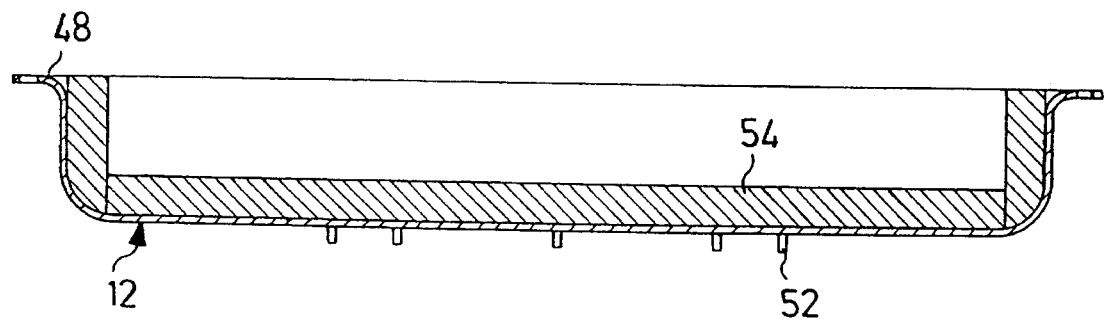
FIG. 9 is a vertical section through the covering hood for the heating device.
Figure 10:
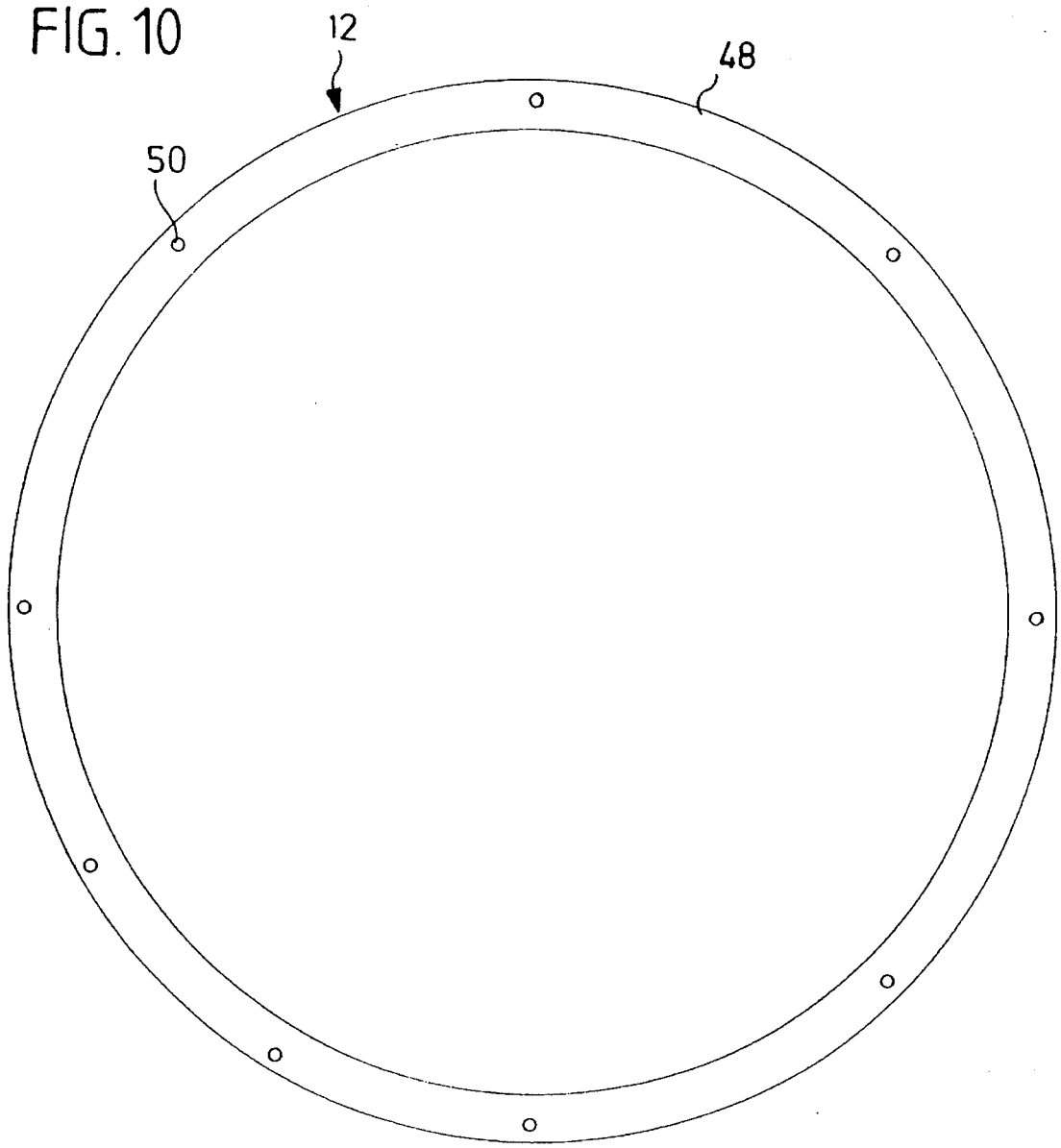
FIG. 10 is a plan view onto the covering hood.

As shown in FIGS. 9 and 10, the covering hood 12 is a pot-shaped metal housing with an attachment flange 48 which is provided with holes 50 penetrated by the threaded bolts 26 and likewise held against the tabletop 10 with nuts 40—FIG. 3 shows these nuts. A circle of threaded bolts 52 is secured to the underside of the covering hood 12 and these serve for the attachment of the support 16. The inner side of the covering hood 12 is lined with heat-insulating material 54 but such that the covering hood 12 can accommodate the copper plate 30, the heating element 32, the reflector 34 and the threaded bolts 24 and nuts 40 holding these parts against the tabletop.

Figure 11:
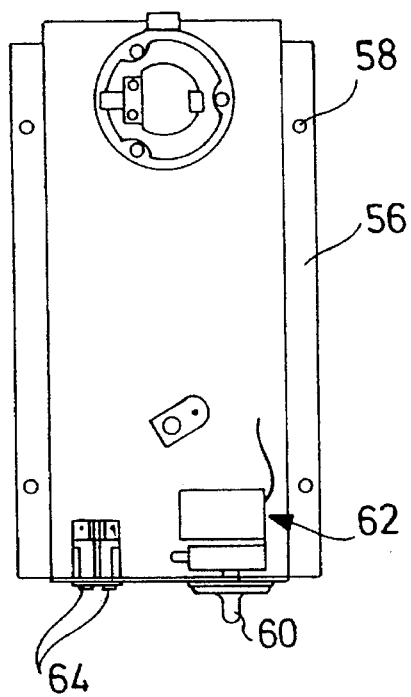
FIG. 11 is a plan view onto the cable conduit housing, viewed at right angles from above.
Figure 12:
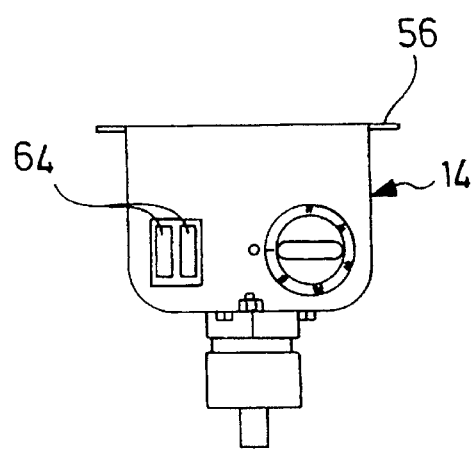
FIG. 12 is a front view of the cable conduit housing.

FIGS. 11 and 12 show details of the cable conduit housing 14 which has an attachment flange 56 with holes 58 penetrated by the threaded bolts 28 so that the cable conduit housing can be secured to the underside of the tabletop 10 with the aid of the threaded bolts 28 and nuts 40 shown in FIG. 5. Since FIG. 11 illustrates the interior of the cable conduit housing 14, it also shows how electric or electronic switching, regulating and display elements are attached to the cable conduit housing 14; these are, in particular, a rotary switch 60 with a switching and regulating device 62 as well as display elements 64 which are intended to indicate the operational state of the inventive device.

FIG. 13 illustrates the support 16 shortened in its length; this is intended to be a hollow body made of stainless steel sheet metal which has an attachment flange 70 at its upper end. This flange has holes 72 for the passage of the threaded bolts 52 fixed to the covering hood 12, the nuts 74 shown in FIG. 1 then being screwed onto these bolts.

The covering hood 20 likewise produced from stainless steel sheet metal is secured to the lower end of the support 16; for this purpose the covering hood has a large central opening, the rim of which is welded to the support 16.

Figure 14:
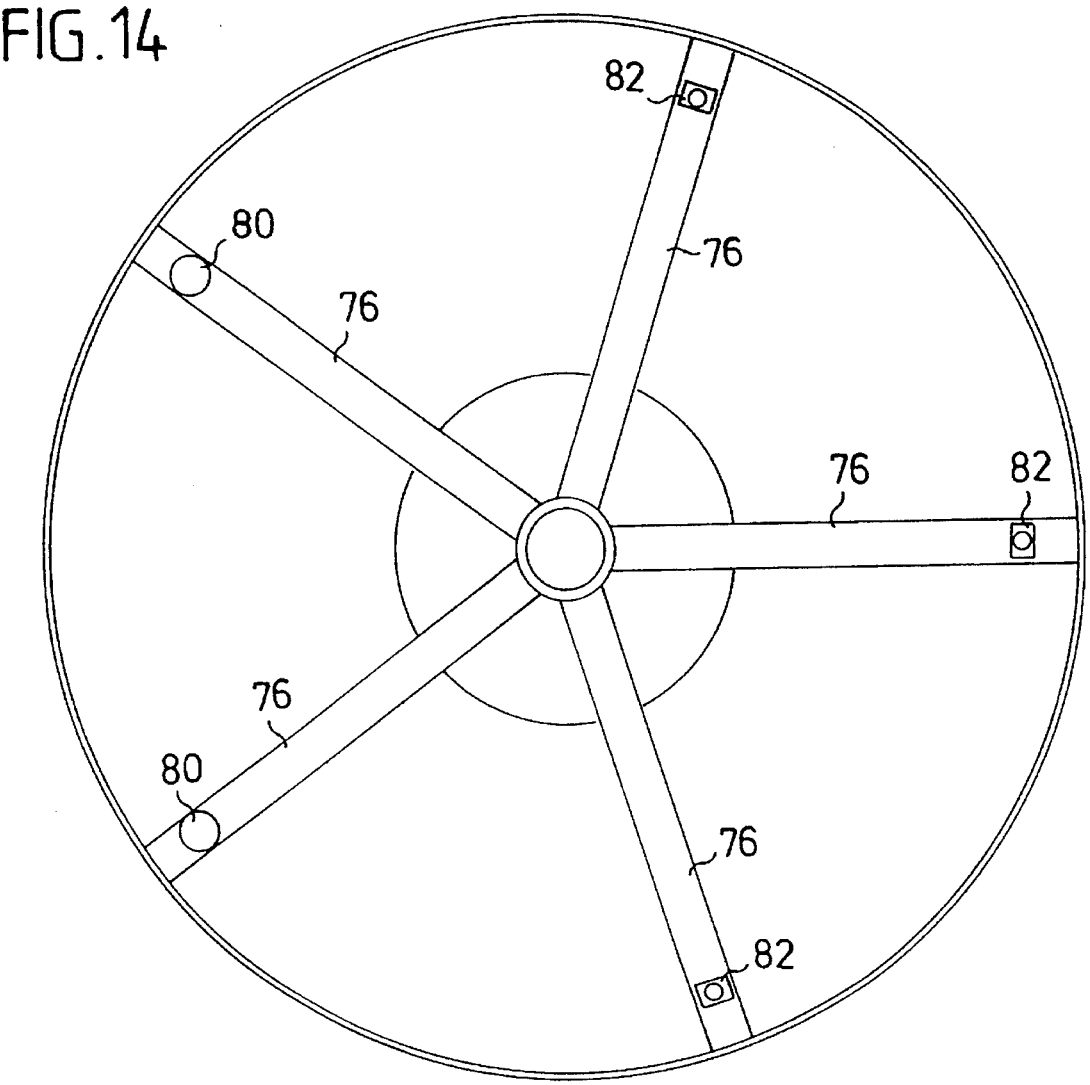
FIG. 14 is a view of the foot from below.
Figure 15:
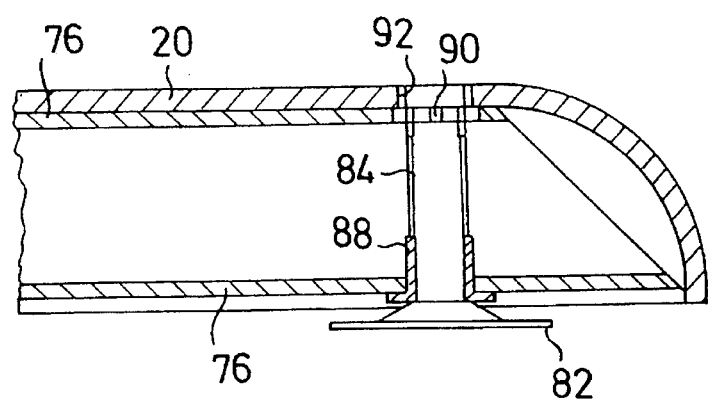
FIG. 15 shows the part of the foot to the right according to FIG. 13 on a larger scale.
Figure 16:
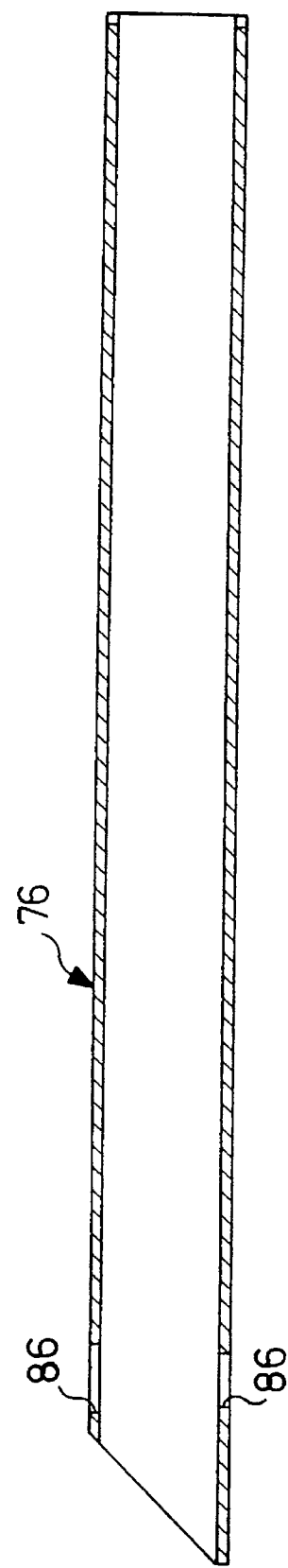
FIG. 16 is a vertical section through one of the profiled arms of the foot.
Figure 17:
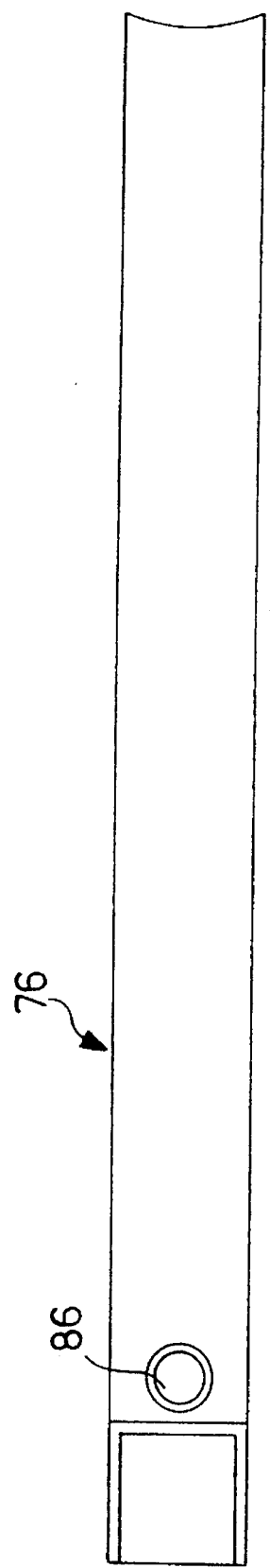
FIG. 17 is a plan view onto this profiled arm.

As is shown particularly clearly in FIGS. 13 and 14, a star-shaped arrangement of profiled arms 76 is inserted into the covering hood 20 from below so as to fit therein. These arms are rigidly connected with one another in that their inner ends are welded to a sleeve 78 having sturdy dimensions. The profiled arms 76 are hollow box sections which expediently consist of stainless steel, like the sleeve 78. The profiled arms 76 bear on their undersides two stationary supporting elements 80 and three height-adjustable supporting elements 82—the supporting elements 80 are therefore rigidly attached to the undersides of the profiled arms 76 bearing them. So that the supporting elements 82 can be adjusted in their height, the following measures which are shown in FIGS. 13 to 17 have been taken:

Each of the plate-like supporting elements 82 is attached to the lower end of a threaded bolt 84, and for each of the supporting elements 82 the associated profiled arm 76 has one above the other two openings 86 which are aligned with one another and in the lower one of which a sleeve 88 having an internal thread is secured, one of the threaded bolts being screwed into this thread. Each of these threaded bolts has a screwdriver slot 90 in its upper end face for the attachment of a screwdriver, and for each of the threaded bolts 84 the covering hood 20 finally has a hole 92 through which the screwdriver slot 90 is accessible. This hole is expediently closed by a plastic plug or plastic cap which is not illustrated, this being designed such that it can easily be withdrawn upwards out of the hole 92.

We claim:

1. An apparatus for preparing foods, said apparatus having the shape of a table and comprising:

an upper unit having:
   a one-piece tabletop of stainless steel sheet metal having a shallow concavity at least in a central region,
   a heating device beneath said tabletop, said heating device for heating the central region of said tabletop,
   a single, one-piece, metal, heat transfer plate at least approximately equal in lateral extent to said central region of said tabletop, said heat transfer plate arranged between said tabletop and said heating device, and having a thermal conductivity greater than that of stainless steel for reducing temperature gradients throughout the extent of the plate, and
   connectors holding said heat transfer plate in contact with an underside of said tabletop substantially over said central region and allowing sliding movement between said tabletop and said heat transfer plate so as to compensate for differing thermal expansions of said tabletop and said heat transfer plate; and a support having a central column with a foot device at a lower end thereof, said support carrying said upper unit.

2. The apparatus as in claim 1 wherein said connectors comprise threaded bolts fixed to and extending transversely from an underside of said central region through openings in said heat transfer plate, and further comprising nuts on said bolts for holding said heat transfer plate in contact with an underside of said tabletop; said bolts and openings being arranged, and said openings being shaped, for allowing sliding movement between said tabletop and at least portions of said heat transfer plate.

3. The apparatus as in claim 2 wherein said threaded bolts include a first threaded bolt fixed to an underside of said central region at its center.

4. The apparatus as in claim 3 wherein said threaded bolts include second threaded bolts lying on a circle surrounding said first threaded bolt, and corresponding openings in said heat transfer plate are eccentric and larger in diameter than said second threaded bolts in a direction radial to said first threaded bolt.

5. The apparatus as in claim 1 wherein said heat transfer plate is a copper plate.

6. The apparatus as in claim 1 wherein said heat transfer plate has a maximum thickness of approximately 3 mm.

7. The apparatus as in claim 1 wherein said heat transfer plate has a maximum thickness of approximately 2 mm.

8. The apparatus as in claim 1 wherein said heat transfer plate has a maximum thickness of approximately 1.5 mm.

9. The apparatus as in claim 2 wherein said threaded bolts comprise stainless steel, and a threaded region of said nuts has at least one layer of a metal softer than stainless steel.

10. The apparatus as in claim 9 wherein said nuts comprise copper.

11. The apparatus as in claim 1 wherein said heating device is an electric heating element clamped between said heat transfer plate and a reflector having the form of a plate and located beneath said heating element.

12. The apparatus as in claim 11 wherein said reflector is metallic, and said reflector and said heat transfer plate have thermal conductivities such that said thermal conductivity of said reflector is lower than that of said heat transfer plate.

13. The apparatus as in claim 12 wherein said reflector is a stainless steel plate.

14. The apparatus as in claim 11 wherein said reflector has a thickness of approximately 2 mm.

15. The apparatus as in claim 11 wherein said reflector is connected to said tabletop by said threaded bolts and nuts.

16. The apparatus as in claim 11 wherein said heat transfer plate and said reflector are approximately equal in lateral extent, and at least of equal lateral extent as said heating element.

17. The apparatus as in claim 15 wherein said first threaded bolt passes through an opening in said heating element, said heating element lies within the circle on which said second threaded bolts lie, said first and second threaded bolts pass through holes in said reflector, and said nuts are located on an underside of said reflector.

18. The apparatus as in claim 16 wherein said first threaded bolt passes through an opening in said heating element, said heating element lies within the circle on which said second threaded bolts lie, said first and second threaded bolts pass through holes in said reflector, and said nuts are located on an underside of said reflector.

19. The apparatus as in claim 18 further comprising spacer elements on said second threaded bolts, said spacer elements located between said heat transfer plate and said reflector, said spacer elements and said heating element having approximately equal thicknesses.

20. The apparatus as in claim 17 further comprising spacer elements on said second threaded bolts, said spacer elements located between said heat transfer plate and said reflector, said spacer elements and said heating element having approximately equal thicknesses.

21. The apparatus as in claim 1 further comprising a covering hood and heat insulating material coating an inside thereof, said hood attached to an underside of said tabletop and covering said heat transfer plate and said heating device.

22. The apparatus as in claim 21 wherein said covering hood is attached to said tabletop by means of threaded bolts fixed to an underside thereof and nuts engaging said threaded bolts.

23. The apparatus as in claim 4 wherein said threaded bolts include third threaded bolts lying on a circle surrounding the circle on which said second threaded bolts lie, said third threaded bolts retaining said covering hood.

24. The apparatus as in claim 21 further comprising an electric switching device secured to an underside of said tabletop, and electric lines connected to said heating device and extending through an opening in said covering hood outwardly to said electric switching device.

25. The apparatus as in claim 24 further comprising a cable conduit housing accommodating said electric lines, said cable conduit housing secured to an underside of said tabletop outside of said covering hood.

26. The apparatus as in claim 15 wherein said switching device is mounted on said cable conduit housing.

27. The apparatus as in claim 15 wherein said cable conduit housing is sheet metal.

28. The apparatus as in claim 25 wherein said cable conduit housing is fixed to said tabletop by nuts engaging threaded bolts fixed to an underside of said tabletop.

29. The apparatus as in claim 2 wherein said threaded bolts are butt-welded to an underside of said tabletop.

30. The apparatus as in claim 21 wherein said column is located beneath said tabletop at its center and is releasably connected to said covering hood.

31. The apparatus as in claim 1 wherein said foot device has a foot and at least three supporting elements on an underside thereof, two of said supporting elements being rigidly connected to said foot and at least one of said supporting elements being capable of adjustment for height.

32. The apparatus as in claim 31 wherein said column has a central longitudinal axis and said foot device has five supporting elements with outer ends located on a circle surrounding said central longitudinal axis of said column, three of said elements circumferentially adjacent each other being capable of adjustment for height.

33. The apparatus as in claim 31 wherein said foot has a downwardly open, dished cover with profiled arms therein, said profiled arms being connected with one another and extending in a star configuration in relation to said central longitudinal axis of said column, each of said profiled arms having a supporting element.

34. The apparatus as in claim 33 wherein each profiled arm having a height-adjustable supporting element has a vertically oriented nut thread into which is screwed a threaded pin having a lower end bearing said supporting element and an upper end with a screw-tool attachment surface, and said foot cover has an opening above each said pin for insertion of a screw tool.

35. The apparatus as in claim 34 wherein said openings for insertion of a screw tool have removable closure plugs.

* * * * *